United States Patent [19]

Piesik

[11] Patent Number: 4,709,780
[45] Date of Patent: Dec. 1, 1987

[54] EXHAUST DISSIPATOR/DISRUPTER DEVICE

[75] Inventor: Edward T. Piesik, Pomona, Calif.

[73] Assignee: General Dynamics, Pomona Division, Pomona, Calif.

[21] Appl. No.: 813,817

[22] Filed: Dec. 27, 1985

[51] Int. Cl.$^4$ .............................................. F02K 1/44
[52] U.S. Cl. .................................... 181/213; 181/217
[58] Field of Search ............... 181/213, 217, 218, 222, 181/239, 267, 271, 275, 278

[56] References Cited

U.S. PATENT DOCUMENTS

| | | | |
|---|---|---|---|
| 2,150,768 | 3/1939 | Hedrick | 181/275 |
| 2,547,936 | 4/1951 | Grow | 60/35.6 |
| 2,692,480 | 10/1958 | Viaud et al. | 60/39.72 |
| 2,957,537 | 10/1960 | Morgan | 181/217 |
| 2,979,151 | 6/1961 | Blackwell et al. | 181/217 |
| 2,987,136 | 12/1961 | Lilley et al. | 181/217 |
| 3,011,584 | 12/1961 | Lemmerman et al. | 181/217 |
| 3,076,521 | 2/1963 | House et al. | 181/278 |
| 3,561,561 | 2/1971 | Trainor | 181/267 |
| 3,635,039 | 1/1972 | Nemcansky et al. | 181/267 |

FOREIGN PATENT DOCUMENTS

| | | | |
|---|---|---|---|
| 393884 | 8/1921 | Fed. Rep. of Germany | 181/239 |
| 406963 | 2/1910 | France | 181/271 |
| 343329 | 9/1936 | Italy | 181/267 |

*Primary Examiner*—Benjamin R. Fuller
*Attorney, Agent, or Firm*—Neil F. Martin; Edward B. Johnson

[57] ABSTRACT

A dissipator device comprises a container having an inlet for connection to a rocket exhaust and a plurality of exhaust orifices of smaller dimensions than the inlet for exhaust flow out of the container in a plurality of different directions. A deflector member is positioned in the container in alignment with the inlet in the path of incoming exhaust gases for deflecting the flow. A disrupter member is positioned between the inlet and deflector member, and has a through bore defining an orifice of area less than the exhaust flow area at the plane of the disrupter member, so that exhaust gases flow both through and around the disrupter member, substantially reducing the downstream pressure and impingement heat transfer.

7 Claims, 4 Drawing Figures

EXHAUST DISSIPATOR/DISRUPTER DEVICE

BACKGROUND OF THE INVENTION

The present invention relates to a device for dissipating and disrupting the exhaust flow from a rocket to reduce the impingement effects on adjacent surfaces.

Rocket exhaust impingement effects extend well beyond the exhaust nozzle exit plane because of the concentrated supersonic flow exhibited by the exhaust. This can damage adjacent surfaces as a result of the pressure and heating effects of the exhaust flow.

In U.S. Pat. No. 2,957,537 of Morgan a device is mounted at a rocket exhaust for reducing the noise and heat of exhaust gases. The device comprises a series of expansion nozzles of decreasing diameter. In the U.S. Pat. No. 3,011,584 of Lemmerman et al a sound attenuating device for a jet aircraft is described, in which a diffuser arrangement is provided comprising a series of angle irons arranged in the form of an open cone concentric with the inlet axis. The edges of the angle irons act to turn, direct and mix the intercepted hot exhaust gases with the surrounding air.

SUMMARY OF THE PRESENT INVENTION

According to the present invention a dissipator/disrupter device for a rocket exhaust is provided, which comprises a container having an inlet for connection to a rocket exhaust and a plurality of exhaust orifices of smaller dimensions that the inlet for exhaust flow out of the container in a plurality of different directions.

Mounted in the container in the path of exhaust gases directed in through the inlet is a disrupter member defining a reduced diameter orifice. Because the disrupter member reduces the flow area, part of the exhaust will flow through the orifice and part will be deflected around it. The disrupter member will have the effect of a quasi-solid surface in the flow path of incoming gases, deflecting some of the flow and introducing a normal shock across the orifice diameter. Thus the downstream pressure and velocity of the exhaust gases are reduced.

Preferably, the container is of elongate shape with the inlet positioned at an intermediate point in its length to direct incoming exhaust gases in a direction transverse to the longitudinal axis of the container. This minimizes the volumetric dimensions directly behind the rocket while providing sufficient space for the necessary number of exhaust orifices to dissipate the exhaust flow sufficiently.

The container preferably includes a solid deflector surface, which may comprise an inner wall portion of the container opposite the inlet or a separate deflector surface mounted facing the inlet and spaced in front of the inner wall of the container downstream of the disrupter member.

A series of disrupter members may be mounted in cascade downstream of the exhaust inlet.

BRIEF DESCRIPTION OF THE DRAWINGS

A better understanding of the present invention will be provided by consideration of the following description of a preferred embodiment of the invention, taken in conjunction with the accompanying drawings, in which like reference numerals refer to like parts, and in which.

DESCRIPTION OF THE PReFERRED EMBODIMENT

Figures 1, 2, 3, 4:
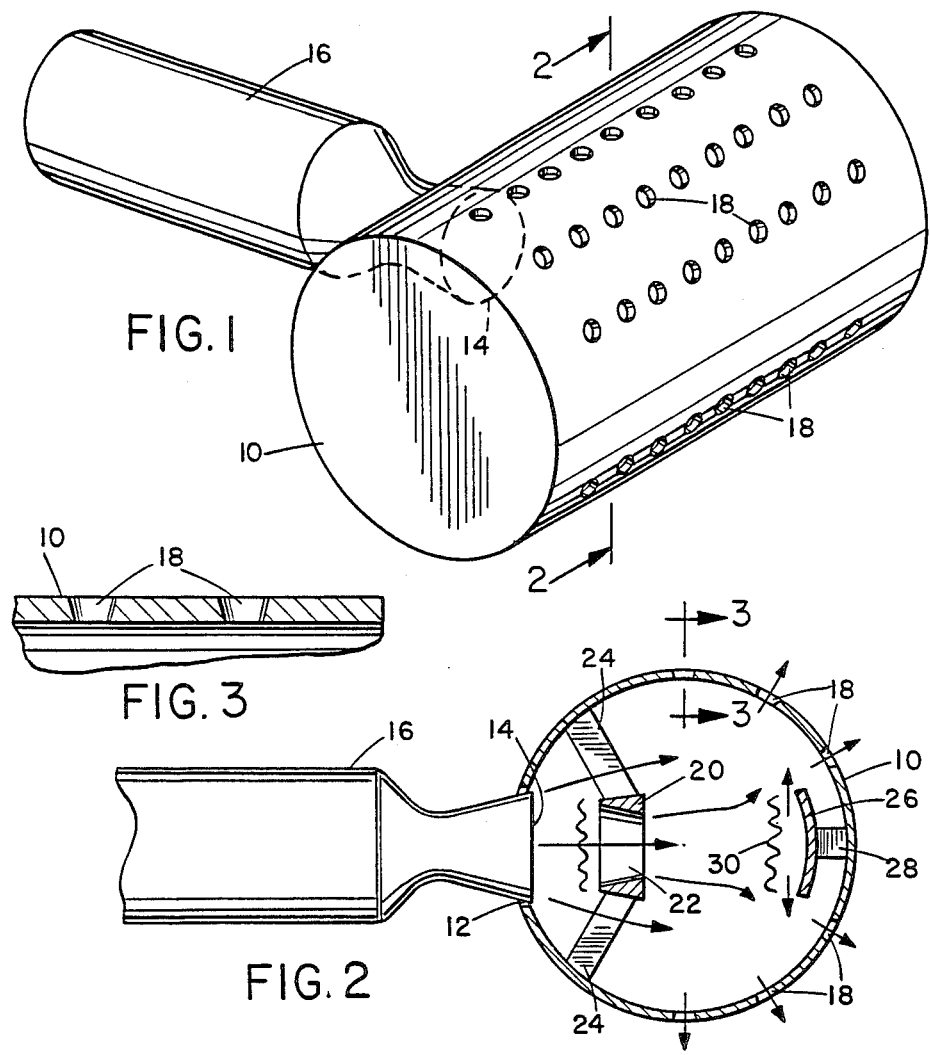
FIG. 1 is a perspective view of a rocket attached to an exhaust dissipator/disrupter.
FIG. 2 is a sectional view taken on line 2—2 of FIG. 1, showing the exhaust flow pattern.
FIG. 3 is an enlarged sectional view taken on line 3—3 of FIG. 2.
FIG. 4 is a view similar to FIG. 2, showing a modification in which the separate deflector plate is removed.

As shown in FIGS. 1 and 2 of the drawings, an exhaust dissipator/disrupter device of dissipating the exhaust flow from a rocket motor comprises a cylindrical container 10 having an inlet 12 at substantially the midpoint in its length for connection to the exhaust 14 of a rocket motor 16.

The container 10 has a plurality of exhaust orifices 18 spaced around its surface for exhaust flow out of the container in a plurality of different directions, as indicated by the arrows in FIG. 2. As shown in FIG. 1, the orifices are arranged in spaced rows around the cylindrical periphery of the container, with a portion having no orifices directly opposite the inlet 12. However, other orifice arrangements are possible. The orifices are preferably circular, but may be of other shapes.

Although the preferred container shape is cylindrical, other shapes may be used with the shape preferably being elongated with the inlet positioned to minimize volumetric dimensions in the rocket axis rearward direction while the container has sufficient surface area to accommodate the desired number of exhaust orifices.

Exhaust gases are directed into the container in the rocket axis rearward direction, as indicated in FIG. 2. Positioned in the container in the path of incoming exhaust gases is a disrupter member 20 defining a reduced area orifice 22 of area less than the exhaust flow area at the plane of the disrupter member. Supports 24 are provided for mounting the disrupter member in position within the container.

The disrupter member is preferably cylindrical with a tapered through bore defining the orifice 22.

The disrupter orifice 22 is preferably of circular cross section and is aligned with the inlet 12. The orifice is of decreasing diameter in the exhaust flow direction. The taper of the bore is preferably between 20 and 30 degrees.

A series of disrupter members may be provided in cascade in the flow direction. The members preferably define a series of orifices or reducing diameter. There are preferably no more than three such disrupter members in the flow path.

A solid, flow deflector surface is also provided in alignment with inlet 12 downstream of the disrupter member or members. This may comprise an inner wall portion 25 of the container opposite the inlet 12, as shown in FIG. 4, or it may be provided by a deflector plate 26 mounted spaced in front of the inner wall portion by support 28, as shown in FIG. 2.

FIG. 3 shows the preferred shape of the exhaust orifices 18. Each orifice preferably comprises a tapered nozzle of area increasing outwardly from the interior of the container.

The exhaust dissipator device shown in the drawings will act to dissipate the single, concentrated exhaust plume directed into the container through inlet 12 and direct it in the general pattern indicated by the arrows in FIGS. 2 and 4.

The incoming exhaust flow will impinge on disrupter member 20, which has the effect of a quasi-solid surface producing a normal shock wave 30 across the orifice in the flow and deflecting the flow both through the reduced area orifice 22 and around the disrupter member 20, as indicated by the arrows in FIGS. 2 and 4. This reduces the velocity of the exhaust flow as well as deflecting at least a portion of the flow out of alignment with the inlet 12, and will reduce the flow concentration and thus the downstream pressure in the flow path. If a cascade of disrupter members is provided, each disrupter member, will intercept the flow from the previous disrupter member, causing an additional normal shock wave and consequent reduction in pressure. If a cascade of disrupter members is provided, the flow intercepted by the last disrupter member must be at sonic velocity or greater.

The effect of the disrupter member or members will be to reduce the Mach number of the exhaust flow at the final impingement region on the internal wall of the device, reducing the impingement load and resulting in a less severe impingement heat flux to the internal wall. The disrupter member or members will also act to enhance dissipation of the exhaust flow uniformly throughout the container and out through the exhaust orifices.

The original exhaust flow will still retain some of its concentration on the impingement region on the inner wall of the device opposite the inlet. A deflector surface, which may be a solid portion 25 of the inner wall (FIG. 4) or a deflector plate 26 spaced in front of the wall (FIG. 2), acts to produce a further normal shock wave 30 and deflects the flow away from the original exhaust flow direction to distribute the flow more uniformly around the volume of the container and through the exhaust orifices.

The impingement surfaces of the or each disrupter member, and the deflector surface 25 or 26, may be coated with thermal ablative material to protect them from the exhaust impingement heating. The entire inner surface of the container may also be coated with thermal ablative material.

The shape of the exhaust orifices 18 acts to enhance thrust on the device introduced by the reduced diameter orifices in opposition to the rearward thrust produced by the rocket motor exhaust internal impingement pressure.

The total area of the orifices is large enough so that the internal pressure of the device will not interfere with the critical flow from the rocket nozzle. The internal pressure must be less than about half the rocket motor internal pressure.

Although a preferred embodiment of the invention has been described above by way of example, it will be understood by those skilled in the field that modifications may be made to the disclosed embodiments which are within the scope of the invention as defined by the appended claims.

I claim:

1. A dissipator device for connection to a rocket exhaust, comprising:
    a container having an inlet at an intermediate point in its length for connection to a rocket exhaust and a plurality of outlet exhaust orifices of smaller dimensions than the inlet for exhaust flow out of the container in a plurality of different directions;
    a solid deflector surface in the container opposite the inlet for deflecting incoming exhaust flow out of the incoming flow direction and into deflected flow directions generally normal to the incoming flow direction; and
    disrupter means in the container in the path of incoming exhaust flow between the inlet and the deflector surface for reducing the pressure of exhaust gases downstream of the disrupter means, the disrupter means comprising a disrupter member spaced from the inlet having a through bore aligned with the inlet, the through bore having an inlet opening at one end positioned closest to the inlet of an area less than the cross-sectional area of the exhaust flow at the inlet opening and shaped for restricting the exhaust gas flow and directing it through and around the disrupter member.

2. The device according to claim 1, in which the through bore is tapered and of reducing area in the exhaust flow direction.

3. The device according to claim 2, in which the through bore is of circular cross-section and defines an included angle of between 20 and 30 degrees.

4. The device according to claim 1, in which the disrupter means comprises a series of members having tapered through bores positioned in the path of incoming exhaust gases, with each member having a bore of area less than the flow area of exhaust gases incident on it.

5. The device according to claim 1, in which the disrupter means is coated with a thermal ablative material.

6. The device according to claim 1, in which the internal surface of the container is coated with thermal ablative material.

7. A dissipator device for connection to a rocket exhaust, comprising:
    an elongated container closed at its opposite longitudinal ends and having an inlet at an intermediate point in its length for connection to a rocket exhaust, the container having a plurality of exhaust orifices along its length of smaller dimensions than the inlet for exhaust flow out of the container in a plurality of different directions;
    a solid deflector surface in the container positioned opposite the inlet for deflecting incoming gas flow out of the incoming flow directions and into opposite directions normal to the incoming flow direction and towards the opposite ends of the container; and
    a disrupter member mounted in the container in the path of incoming gas flow between the inlet and the deflector surface for reducing the pressure of exhaust gases downstream of the disrupter member, the disrupter member having a central through bore aligned with the inlet, the through bore having an inlet opening closest to the inlet which is spaced from the exhaust inlet and has an area less than the cross-sectional area of the exhaust flow at the disrupter member, and being shaped for restricting the exhaust gas flow and directing it to flow both through and around the disrupter member.

* * * * *